United States Patent [19]

Ihlein et al.

[11] 4,131,600

[45] Dec. 26, 1978

[54] HOT-HARDENING REACTION RESIN MIXTURE FOR IMPREGNATING THE INSULATION OF ELECTRICAL EQUIPMENT AND FOR THE MANUFACTURE OF MOLDED MATERIALS WITH OR WITHOUT INSERTS

[75] Inventors: Walter Ihlein, Berlin; Wolfgang Kleeberg, Erlangen; Helmuth Markert, Nuremberg; Willi Mertens, Berlin, all of Germany

[73] Assignee: Siemens Aktiengesellschaft, Munich, Germany

[21] Appl. No.: 856,490

[22] Filed: Dec. 1, 1977

[30] Foreign Application Priority Data

Dec. 3, 1976 [DE] Fed. Rep. of Germany ....... 2655367

[51] Int. Cl.$^2$ ....................... C08G 18/18; C08G 59/18
[52] U.S. Cl. .......................................... 528/53; 528/73
[58] Field of Search .......... 260/47 EC, 47 EP, 77.5 R

[56] References Cited

U.S. PATENT DOCUMENTS

| 3,694,406 | 9/1972 | D'Alelio | 260/42 EP |
| 3,721,650 | 3/1973 | D'Alelio | 260/47 EP |
| 4,070,416 | 1/1978 | Narahara et al. | 260/830 P |

FOREIGN PATENT DOCUMENTS 2139290 8/1970 Fed. Rep. of Germany.
2139291 2/1972 Fed. Rep. of Germany.

*Primary Examiner*—Harold D. Anderson
*Assistant Examiner*—E. A. Nielsen
*Attorney, Agent, or Firm*—Kenyon & Kenyon, Reilly, Carr & Chapin

[57] ABSTRACT

Addition complexes of tertiary amines and boron trichloride of the general formula $BCl_3 \cdot NR_1R_2R_3$ are used as an accelerator system for a heat-curing reaction resin mixture of purified polyisocyanate and polyepoxy resin compounds. Insulation impregnated with this reaction resin mixture exhibits high thermal stability in the hardened condition and can be used at high operating temperatures.

9 Claims, No Drawings

HOT-HARDENING REACTION RESIN MIXTURE FOR IMPREGNATING THE INSULATION OF ELECTRICAL EQUIPMENT AND FOR THE MANUFACTURE OF MOLDED MATERIALS WITH OR WITHOUT INSERTS

BACKGROUND OF THE INVENTION

1. Field of the Invention

The invention relates to a heat curing reaction resin mixture for impregnating the insulation of electrical equipment formed of insulating sleeves which are made of materials in sheet or tape form having a heat resistance which corresponds to at least Class H of electrical conductors, particularly of winding bars or coils of electric machines, and for the manufacture of molded material with or without inserts. More particularly, the invention relates to a heat curing reaction resin mixture comprising, preferably, purified polyisocyanate and polyepoxy resin compounds which contain an accelerator system (catalyst).

2. Description of the Prior Art

Such a heat curing reaction resin mixture for impregnating the windings of electric machines is described in German Offenlegungsschrift No. 24 44 458. With this type of polyisocyanate epoxy resin mixture, molded materials of high dimensional heat resistance, high thermal fatigue strength, as well as with good mechanical and electrical properties can be produced by cross-linking, in the presence of certain accelerator systems. Use of this mixture in engineering applications has, however, encountered difficulties, as the known accelerators or accelerator systems which are mentioned in the German Offenlegungsschrift No. 24 44 458, cause the mixture to harden either too fast or too slow. As a result, with such mixture it becomes impossible, for example, to produce insulation economically, as the viscosity of the mixture either increases too fast, in the case of the fast accelerator systems and, thus, no longer ensures complete impregnation, or increases too slowly, in the case of the slow accelerator systems, and thus, prevents hardening within an economically justifiable time.

It is, therefore, an object of the present invention to develop a heat curing reaction resin mixture of the above type whose viscosity does not appreciably change at room temperature, but which nevertheless can be hardened at higher temperatures in economically short times.

SUMMARY OF THE INVENTION

In accordance with the principles of the present invention, the above and other objectives are realized in a heat curing reaction resin mixture comprising, preferably, purified polyisocyanate and polyepoxy resin compounds and an accelerator system including addition complexes of tertiary amines and boron trichloride with the general formula $BCl_3 \cdot NR_1R_2R_3$, wherein $R_1$, $R_2$ and $R_3$ denote like or different aliphatic, aromatic, heterocyclic or aryl-aliphatic radicals, and wherein $R_1$, $R_2$ and $R_3$ belong, jointly or in pairs, to heterocyclic rings.

The aforesaid accelerator system exhibits a pronounced latency in the reaction resin mixture of polyisocyanate and polyepoxy resin compounds, thereby permitting the reaction resin mixture to be stored at room temperature for weeks without an increase in its very low viscosity values. Thus, the mixture can be employed to impregnate insulating sleeves of electrical equipment at room temperature, with good impregnation being assured. Likewise, the resin can be used to cast molded bodies with or without inserts, at room temperature.

The reaction resin mixture of the invention gels at a temperature of between 70 and 140° C in an economically short time. Accordingly, objects impregnated or cast with the resin can be placed in an oven for the final setting in any desired position without fear that the mixture might flow out. In the hardened condition, the mixture provides insulation or molded materials of high dimensional heat resistance and long-term thermal stability, which can be used at high temperatures such as are prescribed, for instance, for Insultion Class H.

Although the latent acceleration effect of boron trichloride adducts ($BCl_3$ adducts), similar to those of the corresponding boron trifluoride adducts, ($BF_3$ adducts) is known for epoxy resins and epoxy resin hardener systems, respectively, (German Offenlegungsschriften No. 2 139 290 and 2 139 291), it was impossible to predict that the boron trichloride amine complexes would be suitable also for polyisocyanate-polyepoxy resin systems, in which the latent effect is pronounced even more strongly than in the known epoxy resin hardener systems. This result was even more surprising, as the corresponding boron trifluoride amine complexes do not show these properties for the isocyanate-epoxy system and must, therefore, be counted among the commonly used amine accelerators.

A good storability of the reaction resin mixture of the invention is achieved if from 0.01 to 5 percent by weight of accelerator, referred to the polyisocyanate polyepoxy resin mixtures, is employed in the reaction resin mixture. Preferentially, from 0.05 to 2.5 percent by weight of accelerator will be employed to achieve trouble-free gelling at the higher temperatures.

In order to keep the heat aging of an insulation impregnated with the reaction resin mixture of the invention low, it is advantageous to employ polyfunctional isocyanates in the reaction resin mixture in the mass ratio of 2 to 7 and, preferably, 3.5 to 5.5, equivalents per epoxy equivalent epoxy. With this component ratio, the material produced will have a lattice structure of isocyanurate, and polyether structures, in which the mol ratio of oxazolidinone rings to the isocyanurate rings is very small, namely, smaller than 0.5. At higher temperatures, oxazolidinone structures, however, are the weak links in the molecule lattice of the molded material and accelerate thermal aging. Thus, by a suitable choice of the component ratio, the isocyanurate-oxazolidinone ratio of the hardened reaction resin mixture can be influenced advantageously by definite temperature management during the gelling.

It is furthermore advantageous to use as polyisocyanates in the reaction resin mixture of the invention, compounds which are liquid at room temperature, as such compounds are easier to handle. Isomer mixtures of diphenylemethanediisocyanate or toluylenediisocyanate and isophorene diisocyanate are suitable for this purpose.

In selecting the substances to be used for the reaction resin mixture of the invention, attention must be given to purity of the substances. This is important, since the catalysis of the isocyanate-epoxy reaction must be reserved exclusively for the accelerator system employed, as only in this way will the corresponding mixtures exhibit excellent storage stability.

Polyfunctional epoxies suitable for use in the resin mixture of the invention are epoxies like bisphenol A- diglycidyl ether, bisphenol F-diglycidyl ether, resorcin diglycidyl ether, the known cycloaliphatic epoxies, for example, 3.4-eposycyclohexylmethyl-3.4-epoxycyclohexane carboxylate, as well as heterocyclic epoxy compounds with hydantoin basis. Further suitable epoxies are listed in "Handbook of Epoxy Resins" by H. Lee and K. Neville (McGraw-Hill Book Co., 1967). Particularly, suitable are the very pure bisphenol A-diglycidyl ether, very pure bisphenol F-diglycidyl ether and very pure hydantoin epoxy with a low content of hydroxyl groups.

The addition complexes of tertiary amines and boron trichloride which are suitable as accelerator systems of the resin mixture of the invention each can still exhibit different properties which suggest under some conditions a choice of one substance over the other. Proven accelerators are addition complexes of boron trichloride with tertiary amines, in which $R_1$ and $R_2$ include identical radicals, preferably of methyl groups, and $R_3$ is an alkyl, aralkyl, aryl or heterocyclic radical. Addition complexes of boron trichloride with octyldimethylamine have the advantage that they are readily soluble in polyisocyanate and polyisocyanate and polyepoxy resin compounds. On the other hand, addition complexes of boron trichloride with benzyldimethyamine, while more difficult to dissolve, exhibit better storage stability at room temperature; here, too, the complex as such is less hydrolysis-sensitive. Accelerator systems containing NH and OH groups, moreover, are less well suited to the invention, due to the expected considerable thermal aging and the development of thermally relatively unstable urethane and resin structures.

DETAILED DESCRIPTION

The above and other features and aspects of the present invention will become more apparent upon reading the following detailed description wherein a number of examples of the invention will be discussed.

EXAMPLE I

As a first example, the storage stability of a reaction resin mixture having no accelerator system will be investigated first. The components of this reaction resin mixture were as follows: 100 g very pure bisphenol A-diglycidyl ether with an epoxy number of 0.58 to 0.59 and a viscosity of about 8000 cP/25° C; a 150 g. low-viscosity polyisocyanate mixture, the main component of which is an isomer mixture of diphenylmethanediisocyanate and which was obtained by vacuum distillation with a yield of about 80% as a very thin product.

The reaction resin mixture with a mol ratio of polyisocyanate to epoxy resin of almost 2.0 was stored in a closed vessel at 70° C and the respective viscosity values were determined.

Table 1 shows the development of the viscosity of this mixture over a period of 10 days, the first line showing the reaction resin mixture with the polyisocyanate component as received, and the second line the reaction resin mixture with the distilled polyisocyanate component.

Table 1:

| Viscosity in (cP) after storage at 70° C (Measuring temperature: 70° C) | | | |
|---|---|---|---|
| Initial viscosity | after 3 days | after 7 days | after 7 days |
| 15.2 | 26.7 | 47.8 | 98.0 |
| 8.8 | 10.0 | 10.4 | 12.0 |

These values show that through higher purity of the starting components, a substantially higher storage stability is obtained. However, this reaction resin mixture cannot be hardened in economically short times, due to the lack of an accelerator system.

EXAMPLE II

In this example, a mixture of three parts distilled low-viscosity polyisocyanate mixture, the main component of which is an isomer mixture of diphenylmethanediisocyanate, and one part very pure bisphenol A-diglycidyl ether with an epoxy number of 0.58 to 0.59 and a viscosity of about 8000 cP/25° C were added in different experiments in aliquot parts to the following quantities of the accelerators listed below:

1: 0.13% boron trichloride-octyldimethylamine complex
2: 0.15% boron trichloride-benzyldimethylamine complex
3: 0.5 % boron trichloride-pyridine complex
4: 1.0 % boron trifluoride-benzyldimethylamine complex.

Of the above accelerators, those used in experiments 1 to 3 were selected in accordance with the selection rule of the present invention. The accelerator of experiment 4 was not so selected and it was used for comparison purposes.

The development of the viscosity of the reaction resin mixtures of experiments 1 to 4 after storage in closed vessels was then observed. The storage and the measurement were at room temperature. For determining the accelerator concentration, a gelling time of about 50 to about 120 min at 130° C was assumed. The advantages of the accelerator systems according to the invention, i.e., those of experiments 1 to 3, over the accelerator system of experiment 4 are clearly seen from Table 2.

Table 2:

| | Viscosity in (cP) after storage at room temperature; measuring temperature: 23.5° C | | | | | |
|---|---|---|---|---|---|---|
| Exp. No. | Gelling time at 130° C | A | 1 week | 2 weeks | 3 weeks | 4 weeks | 5 weeks |
| 1 | 90 min. | 32.9 | 40.5 | 56.7 | 66.2 | 104.2 | |
| 2 | 58 | 38.4 | 40.1 | 40.8 | 44.1 | 48.3 | 55.0 |
| 3 | 57 | 32.0 | not determined | 45.7 | 112 | 910 | |
| 4 | 120 | 49.7 Solid (gelled after about 4 days | | | | | |

A = initial viscosity

EXAMPLE III

In a final example, test bars in the form of flat copper bars wrapped with 4 layers of half-way overlapping polyimide foil and a cover layer of an aramide fabric, were impregnated at room temperature in a vacuum with a mixture comprising the following: 4 parts distilled low-viscosity polyisocyanate mixture, the main component of which was an isomer mixture of the diphenylmethanediisocyanate; one part of very pure bisphenol A-diglycidyl ether with an epoxy number of 0.58 to 0.59 and a viscosity of about 8000 cP/25° C; and 0.15% $BCl_3$ octyldimethylamine complex. The viscosity of the reaction resin mixture before the impregnation was 29 pC/23.5° C and after the impregnation 29 cP/23.5° C. After the impregnation was completed, the test bars were placed in a heating over at 130° C.

The above-described reaction resin mixture was also placed in molds for forming or casting 3 large standard bars without inserts and a plate 200 mm × 200 mm × 3 mm.

After about one to 1½ hrs., the reaction resin mixture in the test bars and in the molds had gelled. After heating for a total of 3 hours at 130° C, the temperature was further held at 180° C for 24 hours and subsequently another 24 hours at 200° C. The mechanical and electrical properties of the molded materials are shown in Table 3; the impregnation of the insulating sleeve of the test bars was good.

Table 3:

$T_M$: > 220° C

Bending strength: 140 N mm$^{-2}$

Impact bending strength: 10.0 mm N mm$^{-2}$ tan δ at 50 Hz − f (ν): 0.008 (100° C ); 0.006 (150° C); 0.009 (200° C)

What is claimed is:

1. In a heat curing resin mixture, said mixture for impregnating the insulation of electrical equipment formed of sleeves made of insulating materials in foil or tape form with a heat resistance which corresponds to at least Class H of electrical conductors, particularly of winding bars or coils of electric machines, and for manufacturing molded materials with or without inserts, including a mixture of purified polyisocyanate and polyepoxy resin compounds which contain an accelerator system (catalyst), the improvement comprising:
   said accelerator system being formed by addition complexes of tertiary amines and boron trichloride of the general formula $BCl_3 \cdot NR_1R_2R_3$, wherein $R_1$, $R_2$ and $R_3$, are like or different aliphatic, aromatic, heterocyclic or arylaliphatic radicals and wherein $R_1$, $R_2$ and $R_3$ belong to heterocyclic rings jointly or in pairs.

2. In a heat curing reaction resin mixture according to claim 1, the improvement further comprising:
   said acclerator system being 0.01 to 5% by weight, referred to the polyisocyanate-polyepoxy mixture, of the reaction resin mixture.

3. In a heat curing reaction resin mixture according to claim 1, the improvement further comprising:
   said accelerator system being 0.05 to 2.5% by weight of said resin mixture.

4. In a heat curing reaction resin mixture according to claim 1, the improvement further comprising:
   said polyisocyanates being in a mass ratio of 2 to 7 equivalents per epoxy equivalent epoxy.

5. In a heat curing reaction resin mixture according to claim 4, the improvement further comprising:
   said polyisocyanate being formed of compounds that are liquid at room temperature.

6. In a heat curing reaction resin mixture according to claim 1, the improvement further comprising:
   $R_1$ and $R_2$ being of like radicals and $R_3$ being an alkyl, aralkyl, aryl or heterocyclic radical.

7. In a heat curing reaction resin mixture according to claim 6, the improvement further comprising:
   $R_1$ and $R_2$ being identical radicals of methyl groups.

8. In a heat curing reaction resin mixture according to claim 1, the improvement further comprising:
   said accelerator system being formed by addition complexes of boron trichloride with octyldimethylamine.

9. In a heat curing reaction resin mixture according to claim 1, the improvement further comprising:
   said accelerator system being formed by addition complexes of boron trichloride with benzyldimethylamine.

* * * * *